United States Patent
Hwang et al.

(10) Patent No.: US 9,311,524 B2
(45) Date of Patent: Apr. 12, 2016

(54) IMAGE PROCESSING APPARATUS AND IMAGE PROCESSING METHOD

(71) Applicant: Samsung Electronics Co., Ltd., Suwon-si (KR)

(72) Inventors: Won Jun Hwang, Seoul (KR); Dong Soo Kim, Hwaseong-si (KR); Kyung Shik Roh, Seongnam-si (KR); Young Bo Shim, Seoul (KR); Xiangsheng Huang, Beijing (CN)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 360 days.

(21) Appl. No.: 13/706,936

(22) Filed: Dec. 6, 2012

(65) Prior Publication Data

US 2013/0148853 A1    Jun. 13, 2013

(30) Foreign Application Priority Data

Dec. 12, 2011 (KR) .................. 10-2011-0133251

(51) Int. Cl.
*G06K 9/00* (2006.01)
(52) U.S. Cl.
CPC ........ *G06K 9/00268* (2013.01); *G06K 9/00369* (2013.01)
(58) Field of Classification Search
None
See application file for complete search history.

(56) References Cited

U.S. PATENT DOCUMENTS

| | | | |
|---|---|---|---|
| 2005/0280869 A1* | 12/2005 | Kameyama | 358/3.01 |
| 2008/0123968 A1* | 5/2008 | Nevatia et al. | 382/228 |
| 2008/0240500 A1* | 10/2008 | Huang et al. | 382/103 |
| 2009/0226044 A1* | 9/2009 | Ngan et al. | 382/115 |
| 2009/0228841 A1* | 9/2009 | Hildreth | 715/863 |
| 2012/0287035 A1* | 11/2012 | Valko et al. | 345/156 |

FOREIGN PATENT DOCUMENTS

| | | |
|---|---|---|
| JP | 2009-536417 | 10/2009 |
| KR | 10-2010-0072772 | 7/2010 |
| KR | 10-1038650 | 5/2011 |

\* cited by examiner

*Primary Examiner* — Weiwen Yang
(74) *Attorney, Agent, or Firm* — Harness, Dickey & Pierce, P.L.C.

(57) ABSTRACT

An image processing apparatus and method may accurately separate only humans among moving objects, and also accurately separate even humans who have no motion via human segmentation using a depth data and face detection technology. The apparatus includes a face detecting unit to detect a human face in an input color image, a background model producing/updating unit to produce a background model using a depth data of an input first frame and face detection results, a candidate region extracting unit to produce a candidate region as a human body region by comparing the background model with a depth data of an input second or subsequent frame, and to extract a final candidate region by removing a region containing a moving object other than a human from the candidate region, and a human body region extracting unit to extract the human body region from the candidate region.

18 Claims, 10 Drawing Sheets

FIG. 8

| (x-1,y-1) | (x,y-1) | (x+1,y-1) |
| --- | --- | --- |
| (x-1,y) | (x,y) | (x+1,y) |
| (x-1,y+1) | (x,y+1) | (x+1,y+1) |

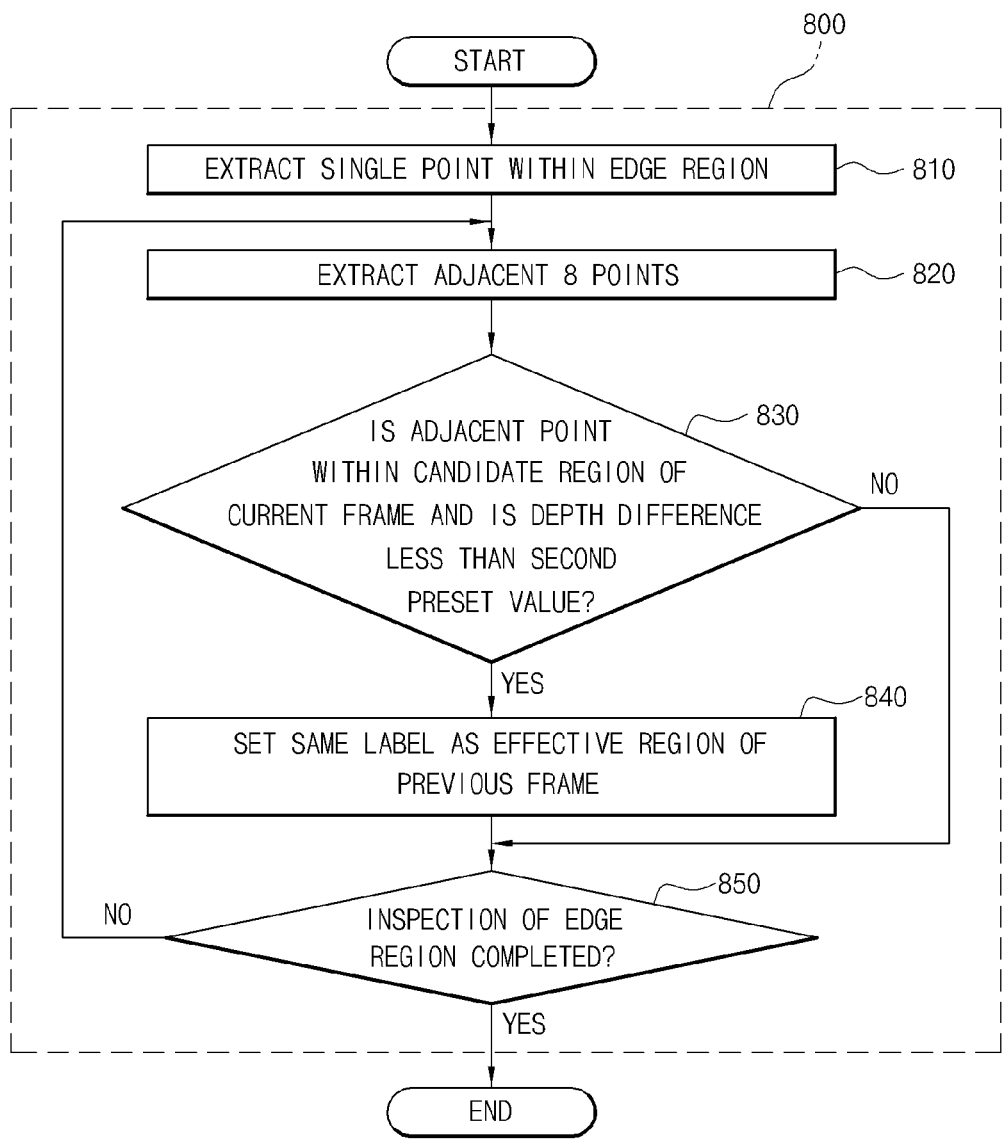

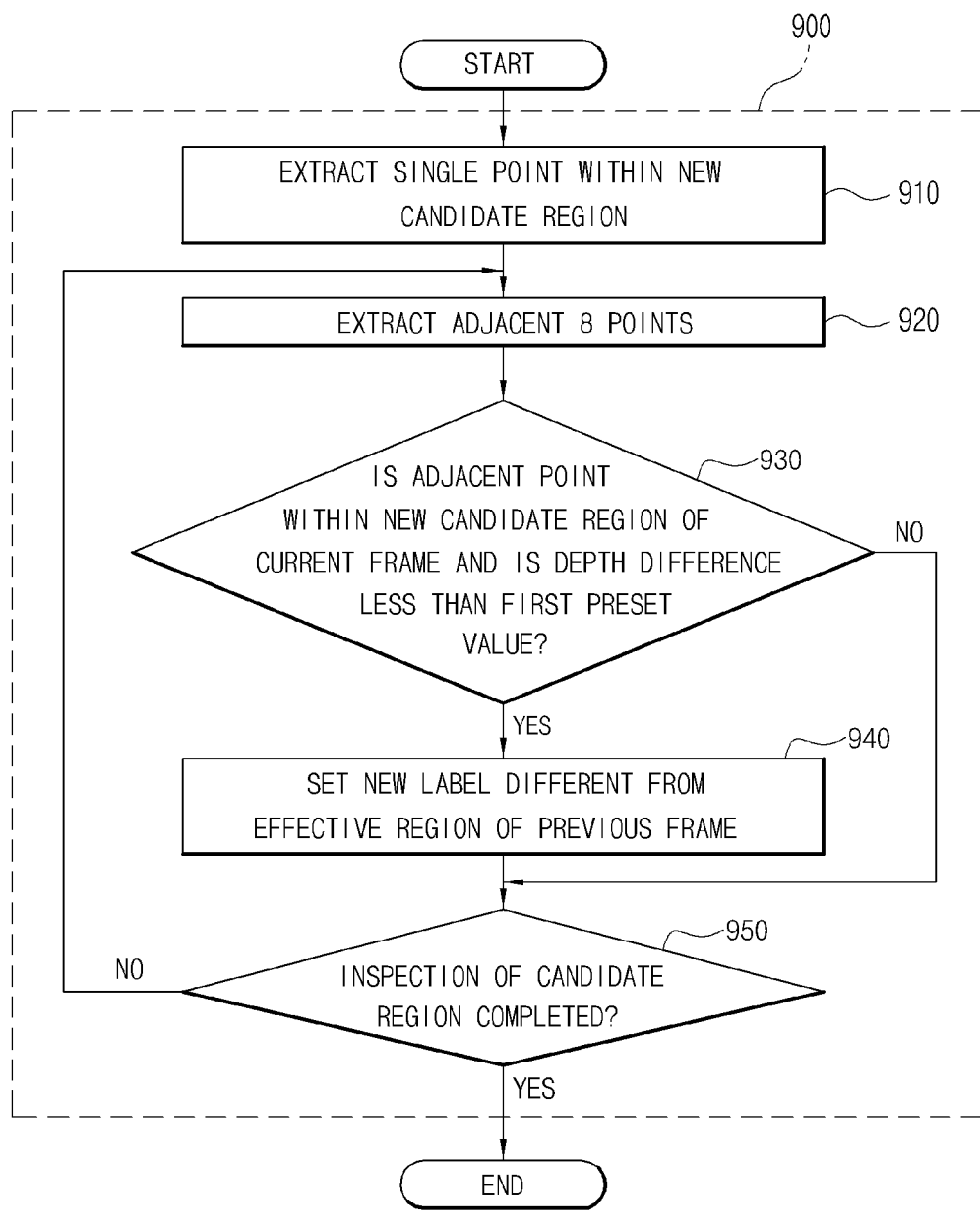

IMAGE PROCESSING APPARATUS AND IMAGE PROCESSING METHOD

CROSS-REFERENCE TO RELATED APPLICATIONS

This application claims the priority benefit of Korean Patent Application No. 10-2011-0133251, filed on Dec. 12, 2011 in the Korean Intellectual Property Office, the disclosure of which is incorporated herein by reference.

BACKGROUND

1. Field

The following description relates to an image processing apparatus and an image processing method, which may extract (i.e. separate) a region of a target object, such as a human body, from an input image.

2. Description of the Related Art

With recent developments in image processing technology, interest in 3-Dimensional (3D) modeling of a target object, such as a human body, is increasing. 3D modeling of a human body may be utilized in Computer Graphics (CG) for virtual reality, movies, or video games, and may be highly useful.

Conventionally, in such human segmentation technology, all moving regions are extracted (separated) as human body regions by modeling a background screen using an image of an input first frame (in this case, assuming that no human is present in the background), and comparing a subsequent input image with the background screen. The conventional technology, however, may have difficulty in sorting and separating a human body region from a background in first frame if the first frame contains humans. Moreover, because the conventional technology sorts all moving regions into human body regions by comparing an input image with a background screen, it may unexpectedly separate moving objects other than humans (e.g., animals, etc.) into humans (human bodies).

SUMMARY

Therefore, it is an aspect of the present disclosure to provide an image processing apparatus and an image processing method, which may accurately separate only humans among moving objects, and also accurately separate humans who have no motion (e.g., humans present in an image of a first frame), based on engagement between human segmentation using a depth data and face detection technology.

The following description relates to a method of isolating a human body region from a background region in an image using depth data, or by using depth data in combination with color data. The method may include detecting a human face in a current frame using either the depth data or color data, and using the detected face to identify a candidate region for a human body. The depth data may be down-sampled for speed enhancement, and pixels may be identified as a human body region a pixel adjacent to an identified human body region pixel is within a human body region in a previous frame and a candidate region in the current frame, or if the depth difference between the human body region pixel and the adjacent pixel is less than a first or a second preset value. After a human body region is identified, the remaining background region is searched for a new human body region using a similar method.

Additional aspects of the invention will be set forth in part in the description which follows and, in part, will be obvious from the description, or may be learned by practice of the invention.

In accordance with an aspect of the present disclosure, an image processing apparatus includes a face detecting unit to detect a human face in an input color image, a background model producing/updating unit to produce a background model using a depth data of an input first frame and detection results of the face detecting unit, a candidate region extracting unit to produce a candidate region that will serve as a human body region by comparing the background model with a depth data of an input second or subsequent frame, and to extract a final candidate region by removing a region, which is judged using the detection results of the face detecting unit as containing a moving object other than a human, from the candidate region, and a human body region extracting unit to extract the human body region from the candidate region that is extracted from the depth data of the current frame using a human body region extracted from the depth data of the previous frame.

The human body region extracting unit may include a first calculator to search the human body region via implementation of tracking using hard constraint conditions, a second calculator to expand the human body region, searched by the first calculator, via implementation of tracking using soft constraint conditions to complete the human body region, and a third calculator to extract a new human body region via inspection of a candidate region that remains rather than being extracted as the human body region during tracking using hard constraint conditions and tracking using soft constraint conditions.

The first calculator may search the human body region from the candidate region extracted from the depth data of the current frame by extracting a single point from the candidate region extracted from the depth data of the current frame, extracting a plurality of points adjacent to the extracted single point if the extracted single point is within a cross region between the human body region extracted from the depth data of the previous frame and the candidate region extracted from the depth data of the current frame, and setting each adjacent point to the same label as the human body region extracted from the depth data of the previous frame if each adjacent point is within the cross region and a depth difference between the extracted single point and each adjacent point is less than a first preset value, and the hard constraint conditions may represent the case in which the depth difference between the extracted single point and each adjacent point is less than the first preset value.

The first calculator may set each adjacent point to an edge region if each adjacent point is within the candidate region extracted from the depth data of the current frame and the depth difference between the extracted single point and each adjacent point is less than a second preset value.

The second calculator may extract the human body region from the candidate region extracted from the depth data of the current frame by extracting a single point from the edge region, extracting a plurality of points adjacent to the extracted single point, and setting each adjacent point to the same label as the human body region extracted from the depth data of the previous frame if each adjacent point is within the candidate region extracted from the depth data of the current frame and the depth difference between the extracted single point and each adjacent point is less than the second preset value, and the soft constraint conditions may represent the case in which the depth difference between the extracted single point and each adjacent point is less than the second preset value.

The third calculator may extract the new human body region from the candidate region that remains rather than being extracted as the human body region during the tracking using hard constraint conditions and the tracking using soft constraint conditions by extracting a single point from the remaining candidate region, extracting a plurality of points adjacent to the extracted single point, and setting each adjacent point to a new label different from the human body region extracted from the depth data of the previous frame if each adjacent point is within the remaining candidate region and the depth difference between the extracted single point and each adjacent point is less than the first preset value.

The human body region extracting unit may further include a post-processor to extract a final human body region by refining the extracted human body region.

The face detecting unit may detect a facial image using an Adaboost algorithm.

The image processing apparatus may further include a down-sampling unit to lower a resolution of the depth data by reducing the number of samples of the input depth data.

The background model producing/updating unit may update the background model using the depth data of the input second or subsequent frame.

In accordance with an aspect of the present disclosure, an image processing apparatus includes a face detecting unit to detect a human face in an input depth data, a background model producing/updating unit to produce a background model using a depth data of an input first frame and detection results of the face detecting unit, a candidate region extracting unit to produce a candidate region that will serve as a human body region by comparing the background model with a depth data of an input second or subsequent frame and to extract a final candidate region by removing a region, which is judged using the detection results of the face detecting unit as containing a moving object other than a human, from the candidate region, and a human body region extracting unit to extract the human body region from the candidate region that is extracted from the depth data of the current frame using a human body region extracted from the depth data of the previous frame.

In accordance with an aspect of the present disclosure, an image processing method includes detecting a human face in an input color image, producing a background model using a depth data of an input first frame and the face detection results, producing a candidate region that will serve as a human body region by comparing the background model with a depth data of an input second or subsequent frame, extracting a final candidate region by removing a region, which is judged using the detection results of the face detecting unit as containing a moving object other than a human, from the candidate region, and extracting the human body region from the candidate region that is extracted from the depth data of the current frame using a human body region extracted from the depth data of the previous frame.

The extraction of the human body region may include searching the human body region via implementation of tracking using hard constraint conditions, expanding the human body region, searched via implementation of tracking using hard constraint conditions, via implementation of tracking using soft constraint conditions, to complete the human body region, and extracting a new human body region via inspection of a candidate region that remains rather than being extracted as the human body region during tracking using hard constraint conditions and tracking using soft constraint conditions.

The implementation of tracking using hard constraint conditions may include extracting a single point from the candidate region extracted from the depth data of the current frame, and extracting a plurality of points adjacent to the extracted single point if the extracted single point is within a cross region between the human body region extracted from the depth data of the previous frame and the candidate region extracted from the depth data of the current frame, and setting each adjacent point to the same label as the human body region extracted from the depth data of the previous frame if each adjacent point is within the cross region and a depth difference between the extracted single point and each adjacent point is less than a first preset value, thereby searching the human body region from the candidate region extracted from the depth data of the current frame, and the hard constraint conditions may represent the case in which the depth difference between the extracted single point and each adjacent point is less than the first preset value.

The implementation of tracking using hard constraint conditions may further include setting each adjacent point to an edge region if each adjacent point is within the candidate region extracted from the depth data of the current frame and the depth difference between the extracted single point and each adjacent point is less than a second preset value.

The implementation of tracking using hard constraint conditions may include extracting a single point from the edge region, extracting a plurality of points adjacent to the extracted single point, and setting each adjacent point to the same label as the human body region extracted from the depth data of the previous frame if each adjacent point is within the candidate region extracted from the depth data of the current frame and the depth difference between the extracted single point and each adjacent point is less than the second preset value, thereby extracting the human body region from the candidate region extracted from the depth data of the current frame, and the soft constraint conditions represent the case in which the depth difference between the extracted single point and each adjacent point is less than the second preset value.

The extraction of the new human body region may include extracting a single point from the candidate region that remains rather than being extracted as the human body region during the tracking using hard constraint conditions and the tracking using soft constraint conditions, extracting a plurality of points adjacent to the extracted single point, and setting each adjacent point to a new label different from the human body region extracted from the depth data of the previous frame if each adjacent point is within the remaining candidate region and the depth difference between the extracted single point and each adjacent point is less than the first preset value, thereby extracting the new human body region from the remaining candidate region.

The face detection may be performed using an Adaboost algorithm.

The image processing method may further include lowering a resolution of the depth data by reducing the number of samples of the input depth data.

In accordance with an aspect of the present disclosure, an image processing method includes detecting a human face in an input depth data, producing a background model using a depth data of an input first frame and the face detection results, producing a candidate region that will serve as a human body region by comparing the background model with a depth data of an input second or subsequent frame, extracting a final candidate region by removing a region, which is judged using the face detection results as containing a moving object other than a human, from the candidate region, and extracting the human body region from the candidate region that is extracted from the depth data of the current frame using a human body region extracted from the depth data of the previous frame.

BRIEF DESCRIPTION OF THE DRAWINGS

These and/or other aspects of the invention will become apparent and more readily appreciated from the following description of the embodiments, taken in conjunction with the accompanying drawings of which:

FIG. 8 is a view explaining extraction of eight points adjacent to a point;

FIG. 9 is a flowchart showing a procedure of implementing tracking using soft constraint conditions shown in FIGS. 3 and 4; and FIG. 10 is a flowchart showing extraction of a new effective region shown in FIGS. 3 and 4.

DETAILED DESCRIPTION

Figure 1:
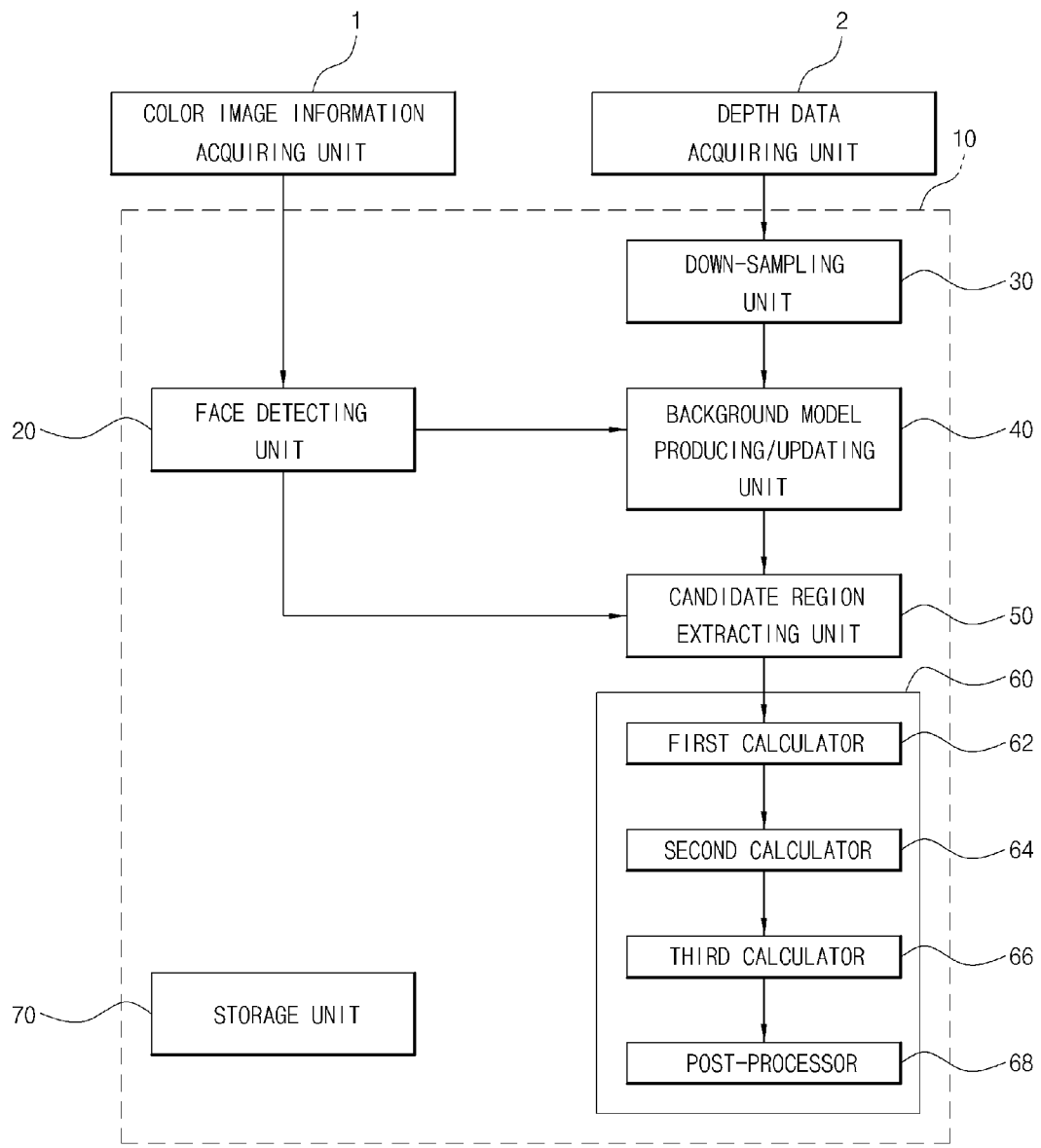
FIG. 1 is a block diagram showing an image processing apparatus according to an embodiment.

Reference will now be made in detail to the embodiments of the present invention, examples of which are illustrated in the accompanying drawings, wherein like reference numerals refer to like elements throughout.

FIG. 1 is a block diagram showing an image processing apparatus according to an embodiment.

As shown in FIG. 1, the image processing apparatus 10 according to an embodiment includes a face detecting unit 20, down-sampling unit 30, background model producing/updating unit 40, candidate region extracting unit 50, human body region extracting unit 60, and storage unit 70.

A color image information acquiring unit 1 acquires an image of a target space at a constant time interval, and transmits color image information on the target space acquired via imaging to the face detecting unit 20. The color image information acquiring unit 1 may employ, for example, a Charge Coupled Device (CCD) camera, or a Complementary Metal Oxide Semiconductor (CMOS) camera. Of course, any other devices capable of acquiring color image information on a target space are effective.

A depth data acquiring unit 2 may be 3D measuring equipment to acquire 3D depth (distance) information of a human (human body) or an object present on a target space from 3D depth data acquired by imaging the target space at a constant time interval. Through recent developments in 3D measuring equipment technologies, 3D depth information on various objects located in a target space may be easily acquired.

The depth data acquiring unit 2 may employ a Time of Flight (TOF) camera. In addition to the TOF camera, of course, any other devices capable of acquiring 3D depth data of humans or objects located in a target space, such as a laser distance sensor or ultrasonic sensor, for example, are applicable.

The TOF camera acquires 3D depth data in a TOF manner that measures the amount of time taken from when infrared light emitted from a light emitting element is reflected by an object and returned to a light receiving element. The TOF camera may calculate 3D depth data from an infrared intensity image without complicated calculation, which enables acquisition of 3D depth data in real time.

Although the color image information acquiring unit 1 and the depth data acquiring unit 2 may be individual devices, they may constitute a single device (e.g., a Kinect sensor, or prime sensor) that may capture a color image (RGB image) and a depth data in tandem.

The face detecting unit 20 removes a background region from the input color image transmitted from the color image information acquiring unit 1, detects a particular component within a face region, and detects a facial image on the basis of the particular component within the face region. The face detecting unit 20 extracts facial information using an Adaboost algorithm that is a representative face detecting algorithm from the input color image. The face detecting unit 20 transmits face detection results to the background model producing/updating unit 40 and the candidate region extracting unit 50.

The down-sampling unit 30 reduces the number of depth data samples input from the depth data acquiring unit 2. That is, the down-sampling unit 30 converts high-resolution depth data into low-resolution depth data for speed enhancement during implementation of calculation using 3D depth (distance) data. For example, the down-sampling unit 30 may convert a down-sampled image having a resolution of 320× 480 from an input image having a resolution of 640×480. The down-sampling unit 30 converts the resolution of a depth data input in a low-pass filter-based down-sampling manner (e.g., a 3×3 weighted sum manner).

The background model producing/updating unit 40 produces a background model using depth data of a first frame transmitted from the down-sampling unit 30 and the face detection results transmitted from the face detecting unit 20. Also, the background model producing/updating unit 40 updates the background model using depth data of a second or subsequent frame transmitted from the down-sampling unit 30. Operation of the background model producing/updating unit 40 will be described later in detail with reference to FIG. 5.

The candidate region extracting unit 50 extracts a closer region (a depth value of which is less than a critical value) than the background model from the input depth data information as a candidate region that may serve as a target object region, i.e. a human body region. The candidate region extracting unit 50 judges a region containing an object (e.g., animal) other than a human using the face detection results transmitted from the face detecting unit 20, and removes the judged region from the candidate region. Operation of the candidate region extracting unit 50 will be described later with reference to FIG. 5.

The human body region extracting unit 60 extracts a human body region (effective region) from a candidate region extracted from a depth data of a current frame using a human body region (effective region) extracted from a depth data of a previous image. The human body region extracting unit 60 includes a first calculator 62, a second calculator 64, a third calculator 66, and a post-processor 68.

The first calculator 62 searches a human body region via implementation of tracking using hard constraint conditions. Operation of the first calculator 62 will be described later in detail with reference to FIGS. 6 to 8.

The second calculator 64 expands a human body region searched from the first calculator 62 via implementation of tracking using soft constraint conditions (e.g., a human body region extracted via implementation of tracking using hard constraint conditions), to complete the human body region (effective region). Operation of the second calculator 64 will be described later in detail with reference to FIG. 9.

The third calculator 66 extracts a new human body region (effective region) via inspection of a candidate region that remains, rather than being extracted as a human body region (effective region) during tracking using hard constraint conditions and tracking using soft constraint conditions (for example, if a new person who was not present in a previous frame appears, extraction of the new person corresponds to extraction of the new human body region). Operation of the third calculator 66 will be described later in detail with reference to FIG. 10.

The post-processor 68 performs a variety of post-processing, such as, for example, outlier removal, hole filling, low-pass filtering, and band-pass filtering, on the extracted human body region (selected pixels), thereby extracting a final human body region (final target object region).

The storage unit 70 is a memory that stores advance information required to implement extraction of a human body region and implementation results of human body region extraction. The storage unit 70 may store first setting value information for use in implementation of tracking using hard constraint conditions, second setting value information for use in implementation of tracking using soft constraint conditions, results of face detection implemented by the face detecting unit 20, the background model produced or updated by the background model producing/updating unit 40, and human body region extraction results acquired via implementation of tracking using hard constraint results and tracking using soft constraint results.

Figure 2:
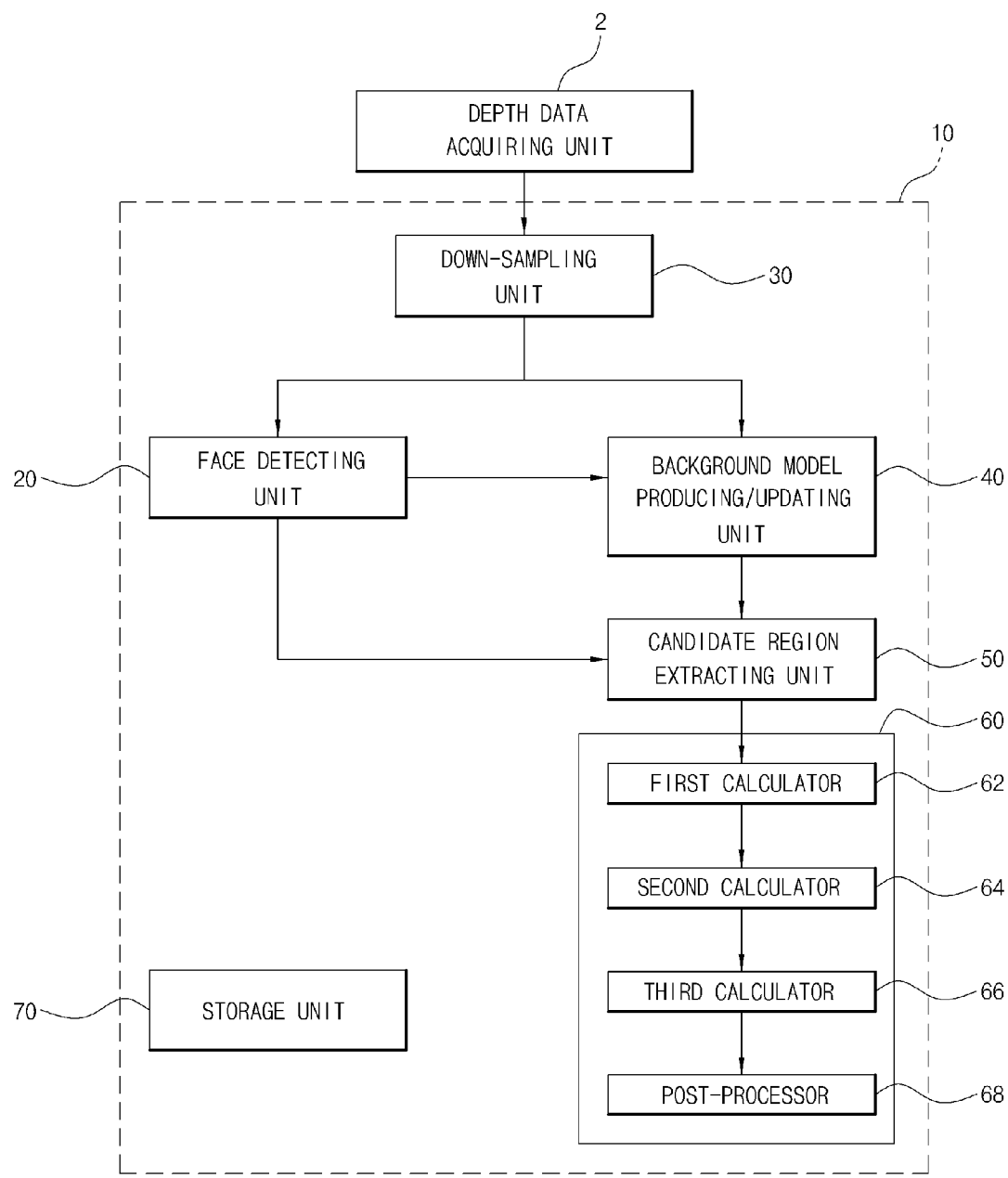
FIG. 2 is a block diagram showing an image processing apparatus according to an embodiment.

FIG. 2 is a block diagram showing an image processing apparatus according to an embodiment.

In the present embodiment, the face detecting unit 20 is configured to detect a facial image from a depth data acquired by the depth data acquiring unit 2. Specifically, the present embodiment differs from the initially described embodiment in terms of the face detecting unit 20 being configured to detect a facial image upon receiving depth data used for human body region extraction, rather than performing face detection upon receiving color image information (the initially described embodiment receives both the color image information and the depth data as input image information, whereas the secondly described embodiment receives only the depth data as input image information).

In the configuration of the image processing apparatus 10 according to an embodiment shown in FIG. 2, other components except for the face detecting unit 20 that detects a facial image from the input depth data transmitted from the down-sampling unit 30 are equal to those of the image processing apparatus 10 according to an embodiment shown in FIG. 1, and thus, a detailed description thereof will be omitted herein.

Hereinafter, an image processing method according to an embodiment will be described with reference to FIG. 3.

When a human body region extracting operation (image processing) begins, the face detecting unit 20 first receives color image information from the color image information acquiring unit 1 (100). Then, the face detecting unit 20 detects a face in an input color image using an Adaboost algorithm (200).

Next, the face detecting unit 20 judges whether a face is detected in the input color image (300).

If a face is detected in the input color image ('Yes' in operation 300), the face detecting unit 20 transmits face detection results to the background model producing/updating unit 40 and the candidate region extracting unit 50 to allow the face detection results to be reflected in operation 600 to search a candidate region that may serve as a target object region, i.e. a human body region.

On the other hand, if no face is detected in the input color image ('No' in operation 300), the method proceeds to operation 1100.

While the face detecting unit 20 receives the color image information from the color image information acquiring unit 1, the down-sampling unit 30 receives depth data from the depth data acquiring unit 2 (400). Specifically, color image information acquisition 100 and depth data acquisition 400 proceed in tandem or within a very short time interval. Thereafter, the down-sampling unit 30 reduces the number of input depth data samples (500). That is, the down-sampling unit 30 converts high-resolution depth data into low-resolution depth data for enhancement in the speed of calculation using 3D depth (distance) data.

Next, the background model producing/updating unit 40 produces depth data of a first frame transmitted from the down-sampling unit 30, and a background model using the face detection results transmitted from the face detecting unit 20. The background model producing/updating unit 40 updates the background model using depth data of a second or subsequent frame transmitted from the down-sampling unit 30.

Thereafter, the candidate region extracting unit 50 extracts a closer region (a depth value of which is less than a critical value) than the background model based on the input depth data as a candidate region that may serve as a target object region, i.e. a human body region. The candidate region extracting unit 50 judges a region containing an object (e.g., animal) other than a human using the face detection results transmitted from the face detecting unit 20, and removes the judged region from the candidate region.

Production and updating of the background model, and extraction of the candidate region as described above are defined as candidate region search operation 600. The candidate region search operation 600 will be described in more detail with reference to FIG. 5.

Next, the first calculator 62 searches a human body region via implementation of tracking using hard constraint conditions (700). The implementation of tracking using hard constraint conditions 700 will be described in more detail with reference to FIGS. 6 to 8.

Thereafter, the second calculator 64 expands the human body region (i.e. the human body region extracted by implementing tracking using hard constraint conditions) from the first calculator 62 by implementing tracking using soft constraint conditions, to complete the human body region (effective region) (800). The implementation of tracking using soft constraint conditions 800 will be described in more detail with reference to FIG. 9.

Next, the third calculator 66 extracts a new human body region (effective region) via inspection of a candidate region that remains, rather than being extracted as a human body region during tracking using hard constraint conditions and tracking using soft constraint conditions (900). The extraction of the new effective region 900 will be described later in detail with reference to FIG. 10.

Thereafter, the post-processor 68 performs a variety of post-processing, such as, for example, outlier removal, hole filling, low-pass filtering, and band-pass filtering, on the extracted human body region (selected pixels), thereby extracting a final human body region (final target object region) (1000).

Next, it is judged whether a human body region extracting operation (image processing) is required (1100). If a user inputs a stop signal with respect to virtual reality, movie, or video game for 3D modeling of a target object, such as a human body, it is judged that a need for the human body region extracting operation (image processing) is eliminated.

If it is judged that the human body region extracting operation (image processing) is required ('Yes' in operation 1100), the image processing apparatus 10 returns to the first operation 100 or 400 to acquire color image information and depth data of a next frame, to continue the human body region extracting operation.

On the other hand, if it is judged that the human body region extracting operation (image processing) is no longer required ('No' in operation 1100), the image processing apparatus 10 ends the human body region extracting operation (image processing).

Hereinafter, an image processing method according to the secondly described embodiment will be described with reference to FIG. 4.

When a human body region extracting operation (image processing) begins, the down-sampling unit 30 first receives depth data from the depth data acquiring unit 2 (400). Then, the down-sampling unit 30 reduces the number of input depth data samples (500). That is, the down-sampling unit 30 converts high-resolution depth data into low-resolution depth data for enhancement in the speed of calculation using 3D depth (distance) data.

Next, the face detecting unit 20 detects a face in the depth data input from the down-sampling unit 30 using an Adaboost algorithm (510).

Thereafter, the face detecting unit 20 judges whether a face is detected in the input color image (520).

If a face is detected in the input depth data ('Yes' in operation 520), the face detecting unit 20 transmits face detection results to the background model producing/updating unit 40 and the candidate region extracting unit 50 to allow the face detection results to be reflected in operation 600 to search a candidate region that may serve as a target object region, i.e. a human body region.

On the other hand, if no face is detected from the input color image ('No' in operation 520), the method proceeds to operation 1100.

In an embodiment, the face detecting unit 20 detects a facial image from the depth data acquired by the depth data acquiring unit 2. That is, the present embodiment differs from the initially described embodiment in terms of the face detecting unit 20 being configured to detect a facial image upon receiving depth data used for human body region extraction, rather than performing face detection upon receiving color image information.

Figure 3:
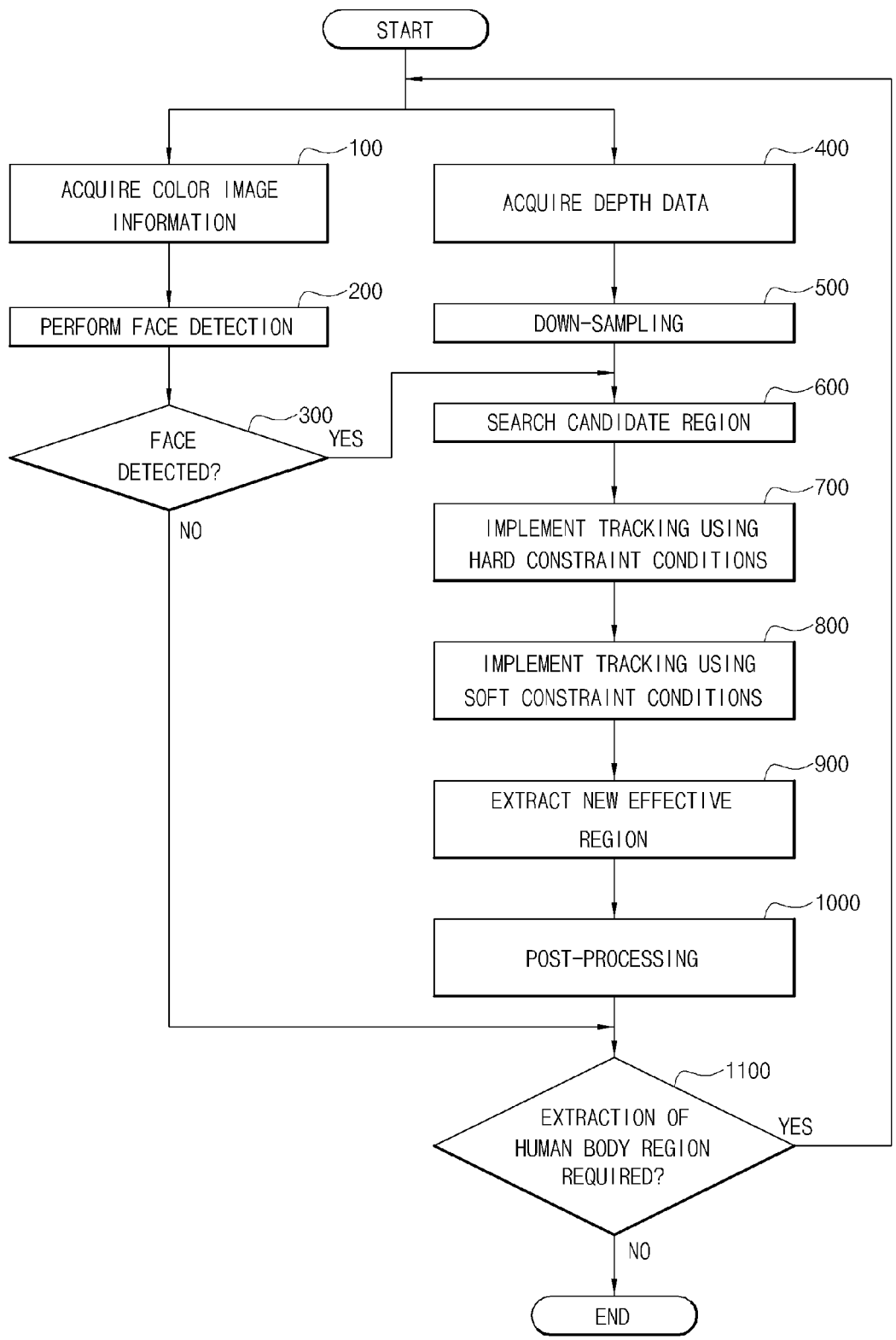
FIG. 3 is a flowchart showing an image processing method according to an embodiment.
Figure 4:
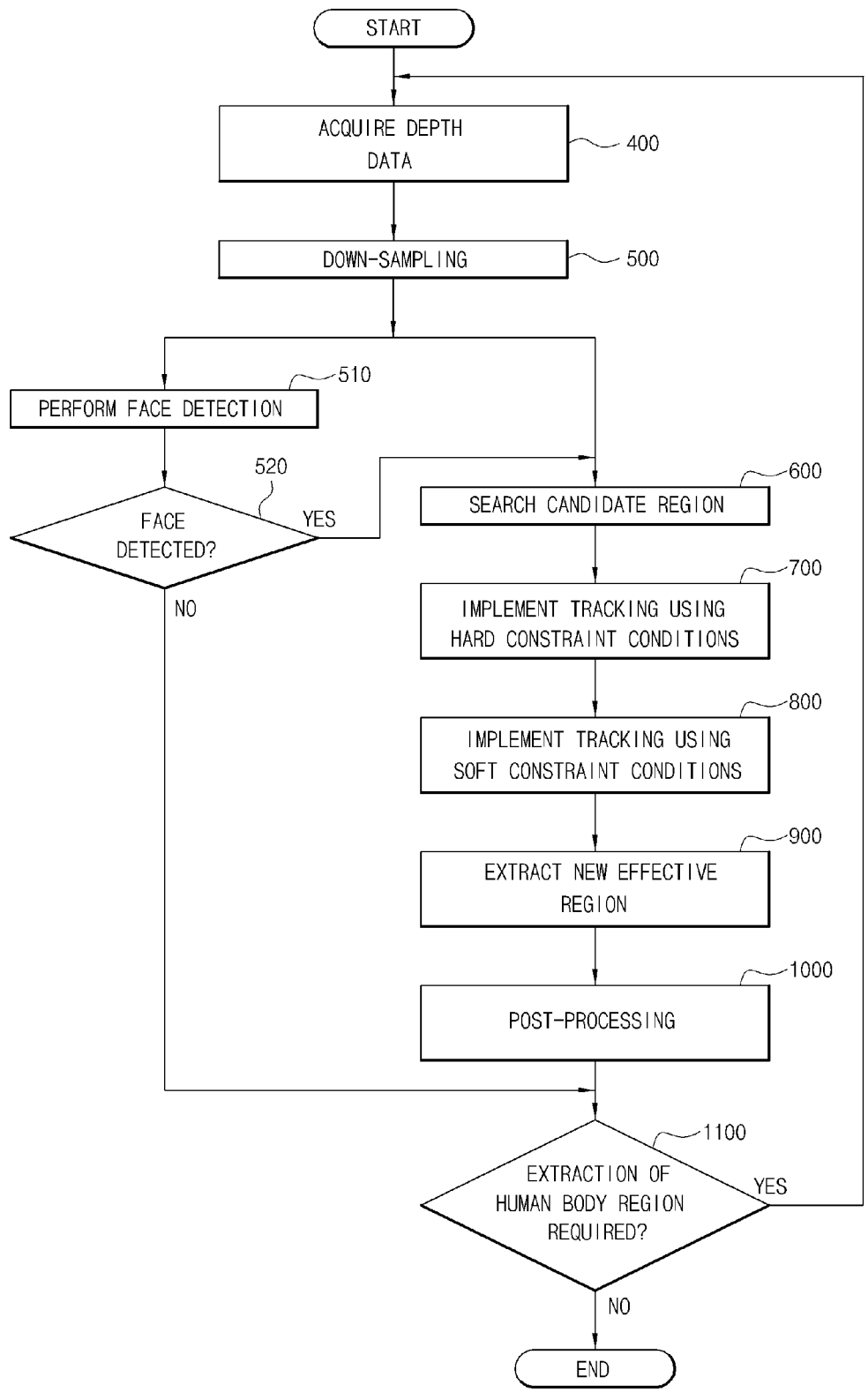
FIG. 4 is a flowchart showing an image processing method according to an embodiment.

In the image processing method according to an embodiment shown in FIG. 4, operations 600 to 1100 are equal to operations 600 to 1100 of the image processing method according to an embodiment shown in FIG. 3, and a detailed description thereof will be omitted herein.

Figure 5:
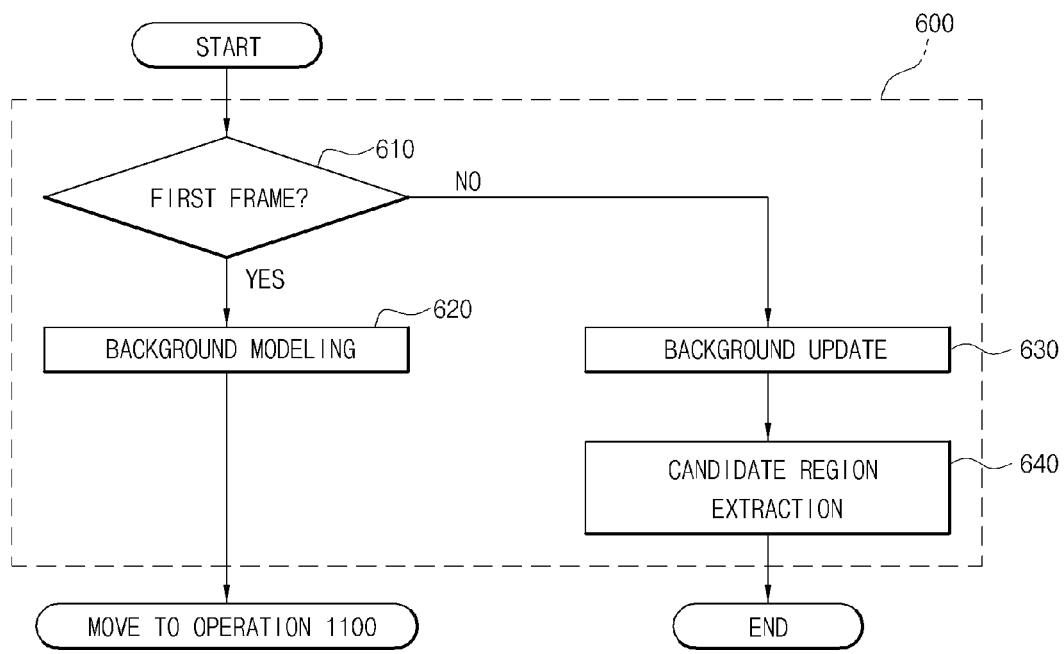
FIG. 5 is a flowchart showing a procedure of searching a candidate region shown in FIGS. 3 and 4.

Hereinafter, the candidate region search operation 600 shown in FIGS. 3 and 4 will be described with reference to FIG. 5.

First, the background model producing/updating unit 40 judges whether the depth data input from the down-sampling unit 30 is an image of a first frame (610).

If the input depth data is the image of the first frame ('Yes' in operation 610), the background model producing/updating unit 40 produces a background model using depth data on the first frame and face detection results transmitted from the face detecting unit 20 (620), and the method proceeds to operation 1100.

In the case of the related art, even if the image of the input first frame contains a human, it may often recognize the human as background and fail to extract a human body region. However, in an embodiment, as a result of reflecting face detection results in background modeling, it may be possible to detect a position of a human (human body) even in the first frame. As such, if the image of the first frame contains a human, it may be possible to accurately separate the human without a risk of including the human into the background. That is, in an embodiment, the human does not need to be in motion for extraction of the human body region to succeed.

On the other hand, the judged result of operation 610 shows that the input depth data is not the image of the first frame, that is, if the input depth data is an image of a second or subsequent frame ('No' in operation 610), the background model producing/updating unit 40 updates the background model using depth data of the input second or subsequent frame (630). In this case, the background model producing/updating unit 40 updates a current stored background model using depth data if the depth data of a region farther than a current stored background region is input. Also, the background model producing/updating unit 40 may update a background model that remains blank due to noise of the depth data acquiring unit 2, or may update a region that has been excluded from background because the image of the first frame contains a human if the human is in motion in an image of a second or subsequent frame.

Next, the candidate region extracting unit 50 performs, based on the input depth data, molding of a closer region (a depth value of which is less than a critical value) than the background model as a candidate region that may serve as a target object region, i.e. a human body region. The candidate region extracting unit 50 judges a region containing an object (e.g., animal) other than a human using the face detection results transmitted from the face detecting unit 20, and removes the judged region from the candidate region, to extract a final candidate region (640). That is, in an embodiment, as a result of reflecting face detection results in the candidate region extraction, it may be possible to accurately separate only a human (human body) among moving objects.

Figure 6:
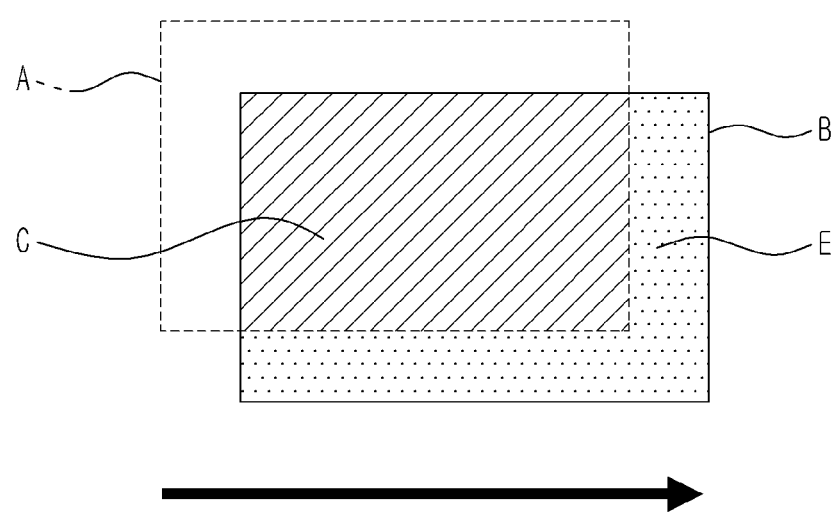
FIG. 6 is a view explaining concepts of a human body region extracted from a previous frame and a candidate region, a cross region, and an edge region extracted from a current frame.

FIG. 6 is a view explaining concepts of a human body region extracted from a previous frame t-1 and a candidate region, a cross region, and an edge region extracted from a current frame t.

In FIG. 6, a rectangle A defined by a dotted line represents a human body region extracted from a previous frame t-1, and a rectangle B defined by a solid line represents a candidate region extracted from a current frame t. Also, a region C designated by deviant crease lines represents a cross region between the human body region extracted from the previous frame and the candidate region extracted from the current frame, and a region E designated by dots represents an edge region.

Figure 7:
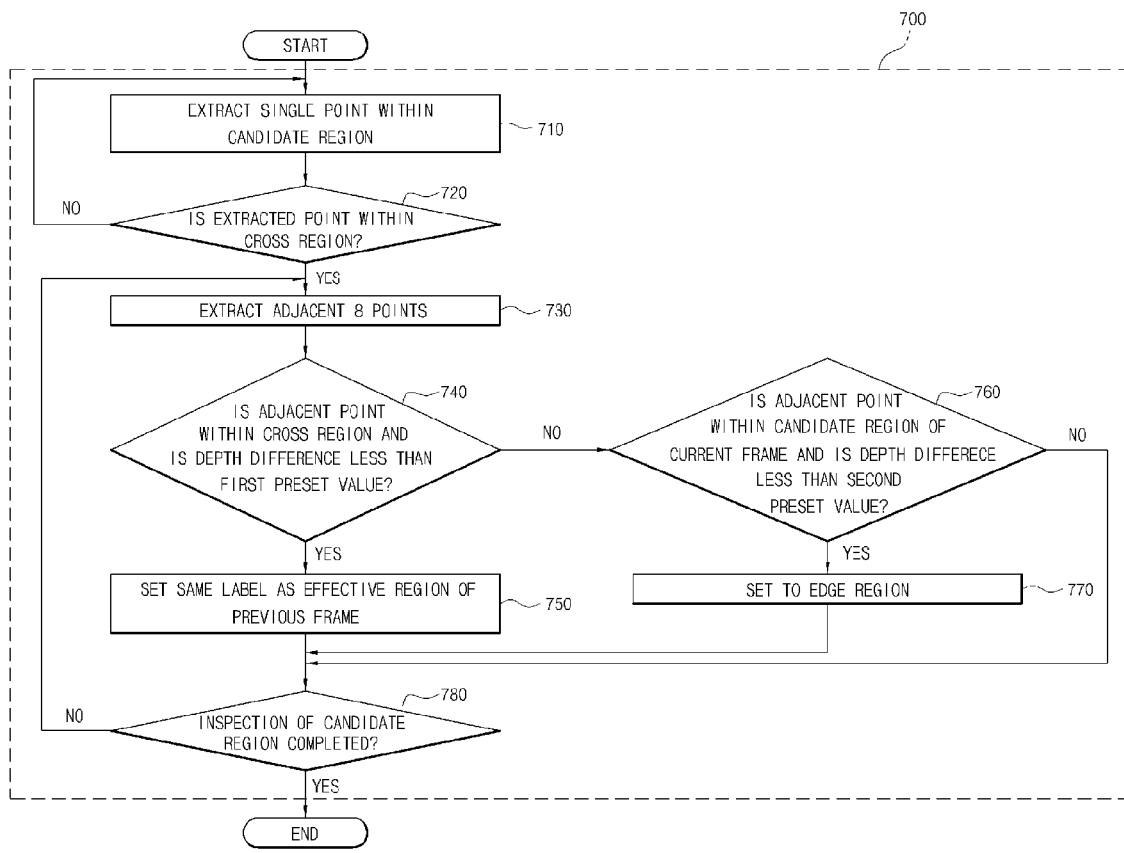
FIG. 7 is a flowchart showing a procedure of implementing tracking using hard constraint conditions shown in FIGS. 3 and 4.
Figure 8:
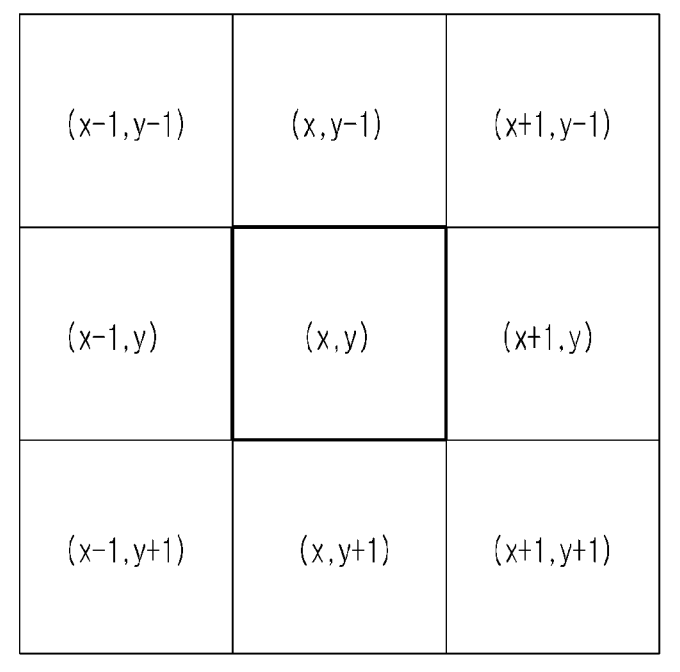

Hereinafter, implementation of tracking using hard constant conditions shown in FIGS. 3 and 4 will be described with reference to FIGS. 6 to 8.

First, the first calculator 62 extracts a point within the candidate region extracted from the current frame via the candidate region extracting unit 50 (710).

Next, the first calculator 62 judges whether the point extracted by the first calculator 62 is within the cross region between the human body region extracted from the previous frame and the candidate region extracted from the current frame (720).

If the extracted point is not within the cross region between the human body region extracted from the previous frame and the candidate region extracted from the current frame ('No' in operation 720), the first calculator 62 returns to operation 710 to extract another point within the candidate region extracted from the current frame.

If the extracted point is within the cross region between the human body region extracted from the previous frame and the candidate region extracted from the current frame ('Yes' in operation 720), the first calculator 62 extracts eight points adjacent to the extracted point (730). Here, the eight points adjacent to the extracted point, as shown in FIG. 8, correspond to the eight points surrounding the extracted point (x, y) from upper and lower, left and right, and diagonal directions.

Thereafter, the first calculator 62 judges whether the adjacent points are within the cross region and whether a depth difference between the extracted point and each adjacent point is less than a first preset value (e.g., 50 mm) (hard constraint conditions) (740).

If the adjacent points are within the cross region and the depth difference between the extracted point and each adjacent point is less than the first preset value ('Yes' in operation 740), the first calculator 62 sets the adjacent points that satisfy the conditions in operation 740 to the same label value as the human body region (effective region) extracted from the previous frame (750). For example, if the human body region extracted from the previous frame has been set (stored) to a label value of "1", the adjacent points that satisfy the conditions in operation 740 are set to the same label value of "1".

On the other hand, if at least one of the adjacent points does not satisfy the conditions in operation 740 ('No' in operation 740), the first calculator 62 judges whether the corresponding adjacent point is within the candidate region of the current frame and whether a depth difference between the extracted point and the adjacent point is less than a second preset value (e.g., 500 mm) (760).

If the adjacent point is within the cross region and the depth difference between the extracted point and the adjacent point is less than the second preset value (e.g., 500 mm) ('Yes' in operation 760), the first calculator 62 sets the adjacent point that satisfies the conditions in operation 760 to the edge region E (770).

If the adjacent point does not satisfy the conditions in operation 760 ('No', in operation 760), the first calculator 62 skips the adjacent point, and moves to operation 780.

Next, the first calculator 62 judges whether inspection of all points present in the candidate region (inspection to judge whether conditions in operations 740 and 760 are satisfied) is completed (780).

If inspection of all the points present in the candidate region is not completed ('No' in operation 780), the first calculator 62 returns to operation 730, to extract eight points adjacent to the respective points that have been set to the same label value as the effective region of the previous frame in operation 750. Thereby, the first calculator 62 repeats the above described operations 740 to 770 until inspection of all the points present in the candidate region is completed.

On the other hand, if inspection of all the points present in the candidate region is completed ('Yes' in operation 780), the first calculator 62 transmits tracking implementation results using hard constraint conditions to the second calculator 64.

Hereinafter, implementation of tracking using soft constraint conditions shown in FIGS. 3 and 4 will be described with reference to FIGS. 6, 8, and 9. In tracking using soft constraint conditions, the edge region set by tracking using the hard constraint conditions is perimetrically expanded, such that a region that has not been extracted as a human body region (effective region) due to hard constraint conditions, is joined to a human body region extracted via implementation of tracking using soft train conditions, or a region, which has been omitted because it is a small effective region and assumed to be noise, is restored.

First, the second calculator 64 extracts a point within the edge region E set via implementation of tracking using hard constraint conditions (810).

Next, the second calculator 64 extracts eight points adjacent to the extracted point obtained in operation 810 (820). Here, the eight points adjacent to the extracted point, as shown in FIG. 8, correspond to the eight points surrounding the extracted point (x, y) from upper and lower, left and right, and diagonal directions.

Thereafter, the second calculator 64 judges whether the adjacent points are within the candidate region of a current frame and whether a depth difference between the extracted point and each adjacent point is less than a second preset value (e.g., 500 mm) (soft constraint conditions) (830).

If the adjacent points are within the candidate region of the current frame and the depth difference between the extracted point and each adjacent point is less than the second preset value ('Yes' in operation 830), the second calculator 64 sets the adjacent points that satisfy the conditions in operation 830 to the same label value as the human body region (effective region) extracted from the previous frame (840). For example, if the human body region extracted from the previous frame has been set (stored) to a label value of "1", the adjacent points that satisfy the conditions in operation 830 are set to the same label value of "1".

On the other hand, if at least one of the adjacent points does not satisfy the conditions in operation 830 ('No' in operation 830), the second calculator 64 skips the adjacent point, and moves to operation 850.

Next, the second calculator 64 judges whether inspection of all points present in the edge region (inspection to judge whether conditions in operation 830 are satisfied) is completed (850).

If inspection of all the points present in the edge region is not completed ('No' in operation 850), the second calculator 64 returns to operation 820, to extract eight points adjacent to the respective points that have been set to the same label value as the effective region of the previous frame in operation 840. Thereby, the second calculator 64 repeats the above described operations 830 and 840 until inspection of all the points present in the edge region is completed.

On the other hand, if inspection of all the points present in the edge region is completed ('Yes' in operation 850), the second calculator 64 transmits tracking implementation results using hard constraint conditions to the third calculator 66.

Hereinafter, extraction of a new effective region shown in FIGS. 3 and 4 will be described with reference to FIGS. 6, 8, and 10. In extraction of a new effective region, a new human body region (effective region) is extracted via inspection of a candidate region that remains without extraction during tracking using hard constraint conditions and tracking using soft constraint conditions. For example, this corresponds to extraction of a new human that has not been in a previous frame, but appears in a current frame.

First, the second calculator 64 extracts a point within a candidate region newly extracted from a current frame (910).

Next, the third calculator 66 extracts eight points adjacent to the extracted point obtained in operation 910 (920). Here, the eight points adjacent to the extracted point, as shown in FIG. 8, correspond to the eight points surrounding the extracted point (x, y) from upper and lower, left and right, and diagonal directions.

Thereafter, the third calculator 66 judges whether the adjacent points are within the candidate region newly extracted from the current frame and whether a depth difference between the extracted point and each adjacent point is less than the first preset value (e.g., 50 mm) (hard constraint conditions) (930).

If the adjacent points are within the candidate region newly extracted from the current frame and the depth difference between the extracted point and each adjacent point is less than the first preset value ('Yes' in operation 930), the third calculator 66 sets the adjacent points that satisfy the conditions in operation 930 to a different label value from the human body region (effective region) extracted from the previous frame (940). For example, if the human body region extracted from the previous frame has been set (stored) to a label value of "1", the adjacent points that satisfy the conditions in operation 930 are set to the same label value of "2".

On the other hand, if at least one of the adjacent points does not satisfy the conditions in operation 930 ('No' in operation 930), the third calculator 66 skips the adjacent point, and moves to operation 950.

Next, the third calculator 66 judges whether inspection of all points present in the new candidate region (inspection to judge whether conditions in operation 830 are satisfied) is completed (950).

If inspection of all the points present in the new candidate region is not completed ('No' in operation 950), the third calculator 66 returns to operation 920, to extract eight points adjacent to the respective points that have been set to the same label value as the effective region of the previous frame in operation 940. Thereby, the third calculator 66 repeats the above described operations 930 and 940 until inspection of all the points present in the edge region is completed.

On the other hand, if inspection of all the points present in the new candidate region is completed ('Yes' in operation 950), the third calculator 66 transmits extraction implementation results of the new effective region to the post-processor 68.

The post-processor 68 performs a variety of post-processing, such as, for example, outlier removal, hole filling, low-pass filtering, and band-pass filtering, on the extracted human body region (selected pixels), thereby extracting a final human body region (final target object region).

As is apparent from the above description, through an image processing apparatus and an image processing method proposed in embodiments of the present disclosure, based on engagement between human segmentation using a depth data and face detection technology, only one human among moving objects may be accurately separated, and moreover, even a human who has no motion (e.g., a human present in an image of a first frame) may be accurately separated.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image processing apparatus comprising:
   a face detecting unit to detect a human face in an input image;
   a background model producing/updating unit to produce a background model using a depth data of an input first frame and detection results of the face detecting unit;
   a candidate region extracting unit to produce a candidate region that will serve as a human body region by comparing the background model with a depth data of an input second or subsequent frame, and to extract a final candidate region by removing a region, which is judged using the detection results of the face detecting unit as containing a moving object other than a human, from the candidate region, wherein the candidate region extracting unit is configured to set a closer region than the background model as the candidate region; and
   a human body region extracting unit to extract the human body region from the candidate region that is extracted from the depth data of a current frame using a human body region extracted from the depth data of a previous frame, the human body region extracting unit including,
     a first calculator to search the human body region from the candidate region extracted from the depth data of the current frame via implementation of tracking using hard constraint conditions,
     a second calculator to expand the human body region, searched by the first calculator, via implementation of tracking using soft constraint conditions to complete the human body region, and
     a third calculator to extract a new human body region via inspection of the candidate region that remains rather than being extracted as the human body region during tracking using the hard constraint conditions used by the first calculator and tracking using the soft constraint conditions used by the second calculator, the new body region being different than the body region extracted from the depth data of the previous frame.

2. The apparatus according to claim 1, wherein the first calculator searches the human body region from the candidate region extracted from the depth data of the current frame by extracting a single point from the candidate region extracted from the depth data of the current frame, extracting a plurality of points adjacent to the extracted single point if the extracted single point is within a cross region between the human body region extracted from the depth data of the previous frame and the candidate region extracted from the depth data of the current frame, and setting each adjacent point to the same label as the human body region extracted from the depth data of the previous frame if each adjacent point is within the cross region and a depth difference between the extracted single point and each adjacent point is less than a first preset value, and wherein the hard constraint conditions represent the case in which the depth difference between the extracted single point and each adjacent point is less than the first preset value.

3. The apparatus according to claim 2, wherein the first calculator sets each adjacent point to an edge region if each adjacent point is within the candidate region extracted from the depth data of the current frame and the depth difference between the extracted single point and each adjacent point is less than a second preset value.

4. The apparatus according to claim 3, wherein the second calculator extracts the human body region from the candidate region extracted from the depth data of the current frame by extracting a single point from the edge region, extracting a plurality of points adjacent to the extracted single point, and setting each adjacent point to the same label as the human body region extracted from the depth data of the previous frame if each adjacent point is within the candidate region extracted from the depth data of the current frame and the depth difference between the extracted single point and each adjacent point is less than the second preset value, and wherein the soft constraint conditions represent the case in which the depth difference between the extracted single point and each adjacent point is less than the second preset value.

5. The apparatus according to claim 4, wherein the third calculator extracts the new human body region from the candidate region that remains rather than being extracted as the human body region during the tracking using hard constraint conditions and the tracking using soft constraint conditions by extracting a single point from the remaining candidate region, extracting a plurality of points adjacent to the extracted single point, and setting each adjacent point to a new label different from the human body region extracted from the depth data of the previous frame if each adjacent point is within the remaining candidate region and the depth difference between the extracted single point and each adjacent point is less than the first preset value.

6. The apparatus according to claim 1, wherein the human body region extracting unit further includes a post-processor to extract a final human body region by refining the extracted human body region.

7. The apparatus according to claim 6, wherein the face detecting unit detects a facial image using an Adaboost algorithm.

8. The apparatus according to claim 1, further comprising a down-sampling unit to lower a resolution of the depth data by reducing the number of samples of the input depth data.

9. The apparatus according to claim 1, wherein the background model producing/updating unit updates the background model using the depth data of the input second or subsequent frame.

10. An image processing apparatus comprising:
a face detecting unit to detect a human face in an input depth data;
a background model producing/updating unit to produce a background model using a depth data of an input first frame and detection results of the face detecting unit;
a candidate region extracting unit to produce a candidate region that will serve as a human body region by comparing the background model with a depth data of an input second or subsequent frame and to extract a final candidate region by removing a region, which is judged using the detection results of the face detecting unit as containing a moving object other than a human, from the candidate region, wherein the candidate region extracting unit is configured to set a closer region than the background model as the candidate region; and
a human body region extracting unit to extract the human body region from the candidate region that is extracted from the depth data of a current frame using a human body region extracted from the depth data of a previous frame, the human body region extracting unit including,
a first calculator to search the human body region from the candidate region extracted from the depth data of the current frame via implementation of tracking using hard constraint conditions,
a second calculator to expand the human body region, searched by the first calculator, via implementation of tracking using soft constraint conditions to complete the human body region, and
a third calculator to extract a new human body region via inspection of the candidate region that remains rather than being extracted as the human body region during tracking using the hard constraint conditions used by the first calculator and tracking using the soft constraint conditions used by the second calculator, the new body region being different than the body region extracted from the depth data of the previous frame.

11. An image processing method comprising:
detecting a human face in an input image;
producing a background model using a depth data of an input first frame and the face detection results;
producing a candidate region that will serve as a human body region by comparing the background model with a depth data of an input second or subsequent frame, wherein the producing the candidate region includes setting a closer region than the background model as the candidate region;
extracting a final candidate region by removing a region, which is judged using the detection results of the face detecting unit as containing a moving object other than a human, from the candidate region; and
extracting the human body region from the candidate region that is extracted from the depth data of a current frame using a human body region extracted from the depth data of a previous frame, the extracting the human body region including,
searching the human body region from the candidate region extracted from the depth data of the current frame via implementation of tracking using hard constraint conditions,
expanding the human body region, searched via implementation of tracking using hard constraint conditions, via implementation of tracking using soft constraint conditions, to complete the human body region, and
extracting a new human body region via inspection of the candidate region that remains rather than being extracted as the human body region during tracking using the hard constraint conditions used during the searching and tracking using the soft constraint conditions used during the expanding, the new body region being different than the body region extracted from the depth data of the previous frame.

12. The method according to claim 11, wherein the implementation of tracking using hard constraint conditions includes:

extracting a single point from the candidate region extracted from the depth data of the current frame, and extracting a plurality of points adjacent to the extracted single point if the extracted single point is within a cross region between the human body region extracted from the depth data of the previous frame and the candidate region extracted from the depth data of the current frame; and setting each adjacent point to the same label as the human body region extracted from the depth data of the previous frame if each adjacent point is within the cross region and a depth difference between the extracted single point and each adjacent point is less than a first preset value, thereby searching the human body region from the candidate region extracted from the depth data of the current frame, wherein the hard constraint conditions represent the case in which the depth difference between the extracted single point and each adjacent point is less than the first preset value.

13. The method according to claim 12, wherein the implementation of tracking using hard constraint conditions further includes setting each adjacent point to an edge region if each adjacent point is within the candidate region extracted from the depth data of the current frame and the depth difference between the extracted single point and each adjacent point is less than a second preset value.

14. The method according to claim 13, wherein the implementation of tracking using hard constraint conditions includes:

extracting a single point from the edge region;

extracting a plurality of points adjacent to the extracted single point; and setting each adjacent point to the same label as the human body region extracted from the depth data of the previous frame if each adjacent point is within the candidate region extracted from the depth data of the current frame and the depth difference between the extracted single point and each adjacent point is less than the second preset value, thereby extracting the human body region from the candidate region extracted from the depth data of the current frame, and wherein the soft constraint conditions represent the case in which the depth difference between the extracted single point and each adjacent point is less than the second preset value.

15. The method according to claim 14, wherein the extraction of the new human body region includes:

extracting a single point from the candidate region that remains rather than being extracted as the human body region during the tracking using hard constraint conditions and the tracking using soft constraint conditions;

extracting a plurality of points adjacent to the extracted single point; and setting each adjacent point to a new label different from the human body region extracted from the depth data of the previous frame if each adjacent point is within the remaining candidate region and the depth difference between the extracted single point and each adjacent point is less than the first preset value, thereby extracting the new human body region from the remaining candidate region.

16. The method according to claim 11, wherein the face detection is performed using an Adaboost algorithm.

17. The method according to claim 11, further comprising lowering a resolution of the depth data by reducing the number of samples of the input depth data.

18. An image processing method comprising:

detecting a human face in an input depth data;

producing a background model using a depth data of an input first frame and the face detection results;

producing a candidate region that will serve as a human body region by comparing the background model with a depth data of an input second or subsequent frame, wherein the producing the candidate region includes setting a closer region than the background model as the candidate region;

extracting a final candidate region by removing a region, which is judged using the face detection results as containing a moving object other than a human, from the candidate region; and extracting the human body region from the candidate region that is extracted from the depth data of a current frame using a human body region extracted from the depth data of a previous frame, the extracting the human body region including, searching the human body region from the candidate region extracted from the depth data of the current frame via implementation of tracking using hard constraint conditions, expanding the human body region, searched via implementation of tracking using hard constraint conditions, via implementation of tracking using soft constraint conditions, to complete the human body region, and extracting a new human body region via inspection of the candidate region that remains rather than being extracted as the human body region during tracking using the hard constraint conditions used during the searching and tracking using the soft constraint conditions used during the expanding, the new body region being different than the body region extracted from the depth data of the previous frame.

* * * * *